Dec. 2, 1947.  S. E. BARTELSON  2,431,908
MOTION PICTURE PROJECTOR FIRE SHUTTER
Filed July 29, 1944
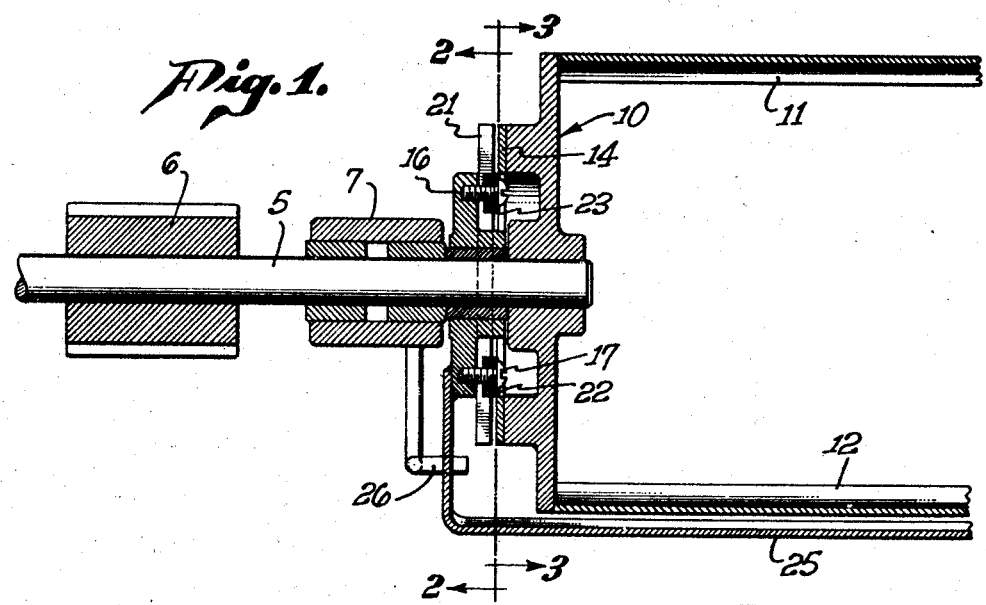
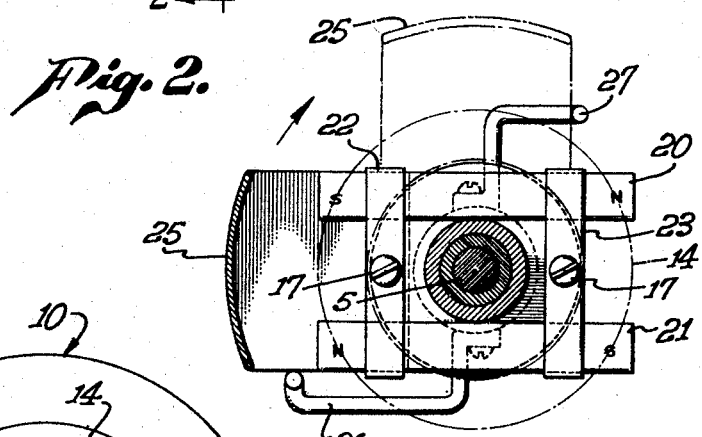
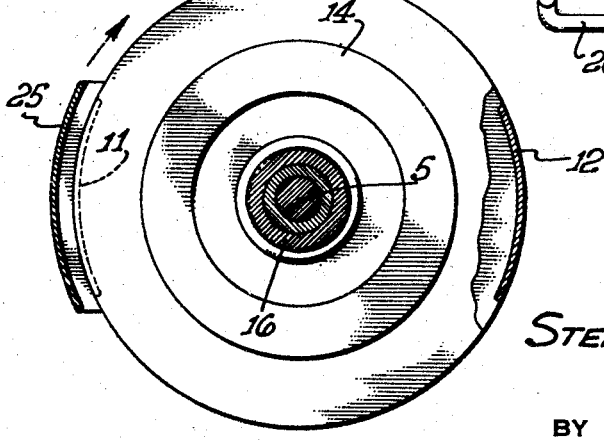
STEN E. BARTELSON,
INVENTOR.
BY *Val R. Goshaw*
ATTORNEY.

Patented Dec. 2, 1947

2,431,908

UNITED STATES PATENT OFFICE 2,431,908

MOTION-PICTURE PROJECTOR FIRE SHUTTER

Sten Erick Bartelson, Indianapolis, Ind., assignor to Radio Corporation of America, a corporation of Delaware Application July 29, 1944, Serial No. 547,246

4 Claims. (Cl. 88—19.4)

This invention relates to motion picture apparatus, and particularly to a fire shutter for motion picture projectors.

The use of fire shutters to eliminate the high intensity light beam from the film in case of film stoppage is well-known, the majority of such devices utilizing a clutch or some form of centrifugal driving arrangement for removing the shutter from the light beam during advancement of the film through the projector and for placing the shutter across the light beam when the advancing mechanism is stopped.

The present invention is directed to a coupling means between an element of the drive or driven mechanism such as the projection shutter and the fire shutter element, the coupling requiring no physical contact of any kind between the elements. The coupling is positive in its action at all times and becomes effective only during relative movement between the driving and driven elements.

The coupling is magnetic, that is, a copper ring driven by the projector mechanism has eddy currents induced therein by a field produced by magnets attached to the fire shutter. Thus, when the copper ring is rotated, the magnets follow the ring to a fixed position where the fire shutter is stopped at a point out of the light beam during the projection of the film. When the ring is stationary, the magnetic attraction is eliminated and the fire shutter is returned by gravity to its light intercepting position.

The principal object of the invention, therefore, is to facilitate the operation of a fire shutter in a motion picture projector.

Another object of the invention is to provide an improved coupling means between a film advancing mechanism and a fire shutter.

A further object of the invention is to provide a fire shutter for a motion picture projector which is positioned in and out of the light beam by a magnetic field.

A still further object of the invention is to provide an improved coupling between a rotating element of a film projector and a fire shutter, the coupling having no physical contact at any time, is positive in its action, and becomes effective only during relative motion between the element and the shutter.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a cross sectional view of a motion picture projector and fire shutter embodying the invention.

Fig. 2 is an end view of the invention taken along the line 2—2 of Fig. 1, and

Fig. 3 is an end view of the invention taken along the line 3—3 of Fig. 1.

Referring now to the drawings in which the same numerals identify like elements, a shaft 5, rotated by a gear 6 in synchronism with the pull-down mechanism (not shown) of the projector, rotates on a bearing 7 and thereby rotates a periodic light intercepting drum shutter 10 having segments 11 and 12. Fixedly mounted on the end of the shutter bracket 10 is a copper ring 14 which will rotate with the shutter.

Mounted on the shaft 5 and rotatable thereon is an annular flange 16 on which are mounted a pair of bar magnets 20 and 21 by means of transverse supports 22 and 23 and screws 17. Attached to flange 16 is a segmental fire shutter 25 which, in its rest position during stationary periods of the shutter 10, is held in a light intercepting position by a bracket stop 26. During rotation of the drum 10, the fire shutter 25 is rotated upwardly by the attraction between the ring 14 and magnets 20 and 21 to a position above the shaft 5, as shown by the dotted lines in Fig. 2, where it is stopped by a bracket stop 27 in a position not to interfere with the projection of the horizontal light beam. The shutter 25 has its center of gravity slightly to the left of the axis of shaft 5 so that when the drum 10 is stopped, gravity returns the shutter 25 to its light intercepting position.

The above described invention is particularly simple in construction, easily mounted on a projector, is positive in its operation, and requires no attention or adjustment after it is once installed. The magnets may be of the simplest form and will give long service.

I claim as my invention:

1. In a motion picture projection device, a rotatable drum shutter for periodically intercepting a light beam, a second shutter positioned co-axially with said first shutter, means for producing a magnetic field, said means including a pair of bar magnets lying in a plane perpendicular to the axis of rotation of said shutters and attached to the end portion of said second shutter, and means mounted on and adjacent the end portion of said first shutter into which eddy currents are induced for rotating said first mentioned means and said second shutter, said last mentioned means including a ring lying in a plane closely adjacent the plane of said bar magnets.

2. Apparatus in accordance with claim 1 in which means are provided for limiting the rotation of said second shutter when said first shutter is rotated and for limiting the rest position of said second shutter when said first shuttter is stationary.

3. In a motion picture apparatus for projecting motion pictures, the combination of a rotatable drum shutter for periodically intercepting a light beam before impression on a motion picture film, a second shutter mounted co-axially with said first shutter for intercepting light during the stationary periods of said first shutter, and to be removed out of said light beam during rotation of said first shutter, said shutters having end portions in planes adjacent one another, a copper ring mounted on the end portion and rotatable with said first shutter, and magnets attached to the end portion of said second shutter and lying in a plane closely adjacent the plane of said ring and rotatable during rotation of said copper ring for attracting said magnets and thereby moving said second shutter out of said light beam, said second shutter being moved by gravity to its light intercepting position when said first shutter and ring are stationary.

4. A motion picture apparatus in accordance with claim 3 in which means are provided for limiting the movement of said second shutter between a light intercepting position and a light passing position.

STEN ERICK BARTELSON.

REFERENCES CITED

The following references are of record in the file of this patent:

UNITED STATES PATENTS

| Number | Name | Date |
| --- | --- | --- |
| 1,212,692 | Ruckgaber | Jan. 16, 1917 |
| 2,206,696 | Hall | July 2, 1940 |
| 1,885,631 | Sapier | Nov. 1, 1932 |
| 863,517 | Dustin | Aug. 13, 1907 |
| 1,719,377 | Kosken | July 2, 1929 |
| 1,830,567 | Shapiro | Nov. 3, 1931 |

FOREIGN PATENTS

| Number | Country | Date |
| --- | --- | --- |
| 475,144 | Great Britain | Nov. 15, 1937 |